May 12, 1959     G. H. SCHURGER     2,885,915
MACHINE TOOL TABLE
Filed Aug. 16, 1956
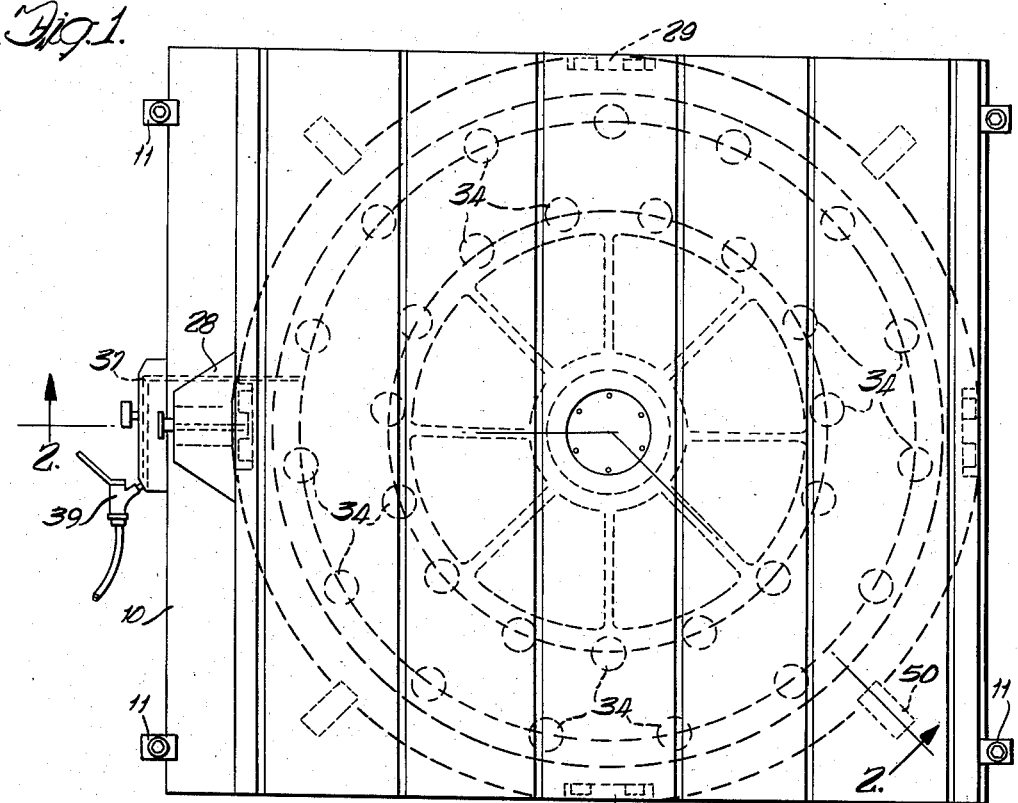
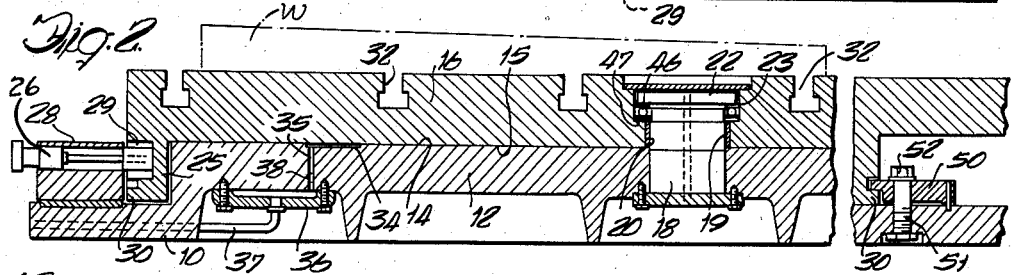
Inventor
Garner H. Schurger
By Carlson, Pitzner, Hubbard & Wolfe
Attorneys

United States Patent Office 2,885,915
Patented May 12, 1959

2,885,915

MACHINE TOOL TABLE

Garner H. Schurger, Fond du Lac, Wis., assignor to Giddings & Lewis Machine Tool Company, Fond du Lac, Wis., a corporation of Wisconsin Application August 16, 1956, Serial No. 604,550

7 Claims. (Cl. 77—64)

The present invention relates generally to rotary machine tool tables. This application is a continuation-in-part of copending application Serial No. 488,593, filed February 16, 1955, now Patent No. 2,787,175.

Machine tool work supporting tables must often be made conveniently movable, both rotatable and liftable for rotation, and yet capable of being locked in a precisely predetermined position. A common example of such a workholder is the rotary table or platen used with machine tools such as horizontal boring machines and the like. The performance of machining operations on large, heavy workpieces is complicated by the difficulty involved in orienting such workpieces with respect to the machine tool spindle or cutting head. Such workpieces are generally supported on a table which can be moved to position the work and which can be clamped securely in place to hold the workpiece stationary during the machining operation.

Mechanical bearing devices for supporting rotatable tables have proven unsatisfactory for large workpieces because of their tendency to bind, wear or be deformed by the weight of the workpiece. The tables themselves must be of great weight to support such workpieces which further aggravates the binding and wearing problem of the bearings. Attempts have been made to overcome these problems by the use of hydraulic or pressure fluid lifted work tables in which pressure fluid is applied to a single large area on the undersurface of the work supporting table.

The large, heavy workpieces of the type desirably supported on a fluid lifted table are of such a size and shape, however, that their weight is generally distributed asymmetrically or off-center of the table. When a table of the type heretofore known and carrying such an off-center load is raised by a pressure fluid lifting means applying pressure fluid to a single area on the table undersurface, the table tends to tilt and bind on its base. Rotation then becomes impossible and damage is likely to result to the table or its base.

It is therefore the principal object of the present invention to provide a rotary machine tool table having an improved fluid lift means to facilitate rotation of the table between different indexed positions.

It is another object of the present invention to provide an improved fluid lift table of the foregoing type which is simple to construct and assemble and which is suitable for off-center or asymmetric loads.

It is a more detailed object of the present invention to provide an improved rotary indexing work table of the above type which can be easily rotated or positioned while carrying an asymmetrically stationed heavy load and which may be securely supported and held in a selected position to rigidly support the workpiece during a machining operation.

A further object of the present invention is to provide an improved workpiece supporting table of the foregoing characteristics which is capable of supporting, for movement about a vertical axis, an asymmetrically placed workpiece without binding on its base due to tilting forces caused by the asymmetric load.

Still another object of the present invention is to provide an improved pressure fluid lifted table of the above type which will rotate about a fixed center without binding when carrying an asymmetrically placed workpiece.

Other objects and advantages of the invention will become apparent as the detailed description proceeds, taken in connection with the accompanying drawing in which:

Figure 1 is a top view of an illustrative rotary table incorporating the present invention.

Fig. 2 is an enlarged sectional view taken substantially along the plane of line 2—2 of Fig. 1 and showing the table in its lowered, fixed position.

Fig. 3 is a schematic drawing of a rotary worktable in the raised position and loaded with an off-center workpiece, the clearances and dimensions being exaggerated for purposes of illustration.

Fig. 4 is an enlarged view of a fluid constrictor useful in the table of Figs. 1 and 2.

While the invention is susceptible of various modification and alternative constructions, an illustrative embodiment has been shown in the drawings and will be described below in detail. It is to be understood, however, that there is no intention to limit the invention to the specific form disclosed. On the contrary, the intention is to cover all modifications, alternative constructions and equivalents falling within the spirit and scope of the invention as expressed in the appended claims.

Referring now to Figs. 1 and 2, there is shown a rotary table constructed in accordance with the present invention. The rotary table is designed in this case as an attachment for a horizontal boring machine and is adapted to be fastened to the table of such machine so that a workpiece, when clamped to the rotary table, may be indexed to present four sides of the workpiece to the boring machine tool spindle, eliminating the difficult steps of removing and resetting the work on the machine tool table.

The rotary table comprises a base 10, suitably of rectangular shape and in this instance made of heavy cast iron adapted to be clamped to a surface such as the above mentioned boring machine platen by suitable clamps 11. A raised, circular base portion 12 has a flat upper surface 14 which supports the complementary lower surface 15 of a worktable 16 adapted to receive and hold a workpiece W (shown in phantom in Fig. 2). The worktable 16 is rotatable on the base 10 about a stub shaft 18 extending upwardly from the lower surface of the base. A bushing or sleeve 19 is seated in a center bore 20 in the worktable as a bearing surface and an enlarged diameter upper end portion 22 of the stub shaft 18 fits in an enlarged portion 23 of the center bore 20 and restricts separation of the worktable 16 from the base 10 in a manner to be further described below.

A downwardly extending circular rim or apron 25 on the lower surface 15 of the worktable surrounds the circular raised portion 12 of the base and guards against entry of liquid coolant and chips between the table and the base. Clearances between the inner and lower surfaces of the rim 25 and the facing surfaces of the base may be large and are not critical in view of the raised support surface 14 of the circular base portion 12. The rim 25 has a substantial thickness to provide a solid housing for positioning means 28 on the base 10 engageable with stations 29 positioned near the outer diameter of the rim. The rim is also undercut to define an outer circular clamping flange 30 at its lower end.

The worktable 16 that is the upper or work-supporting member may have any desired shape, being suitably squared for a four-position table as its outline does not interfere with its rotation past the positioning stations. As shown, the worktable 16 is also preferably provided with T-slots 32 to facilitate the clamping of workpieces to it.

In accordance with the present invention, rotation of the heavy worktable 16 and the heavy workpiece W supported thereon is facilitated by an improved pressure fluid lift device so that the worktable, when lifted, presents very little friction upon rotation to a selected indexing position despite the large mass of the worktable and despite the fact that the worktable may be asymmetrically loaded by the supported workpiece. The lifting required is limited to a few thousandths of an inch, the worktable sliding vertically on the stub shaft 18 to this extent. Under asymmetrically loaded conditions, as shown for example by the off-center workpiece W in Fig. 2, unbalanced forces are exerted by the workpiece on the worktable to the extent that such forces are not evenly distributed about the axis of rotation of the worktable.

In order to lift the worktable 16 and the off-center workpiece W, pressure fluid from suitably disposed apertures is applied to the undersurface 15 of the worktable 16 to create a fluid pressure lifting force thereon. The arrangement is such that the fluid pressure under that portion of the worktable 16 having the heavier loading is greater than the fluid pressure under the opposite portion of the worktable which carries a relatively lighter loading. Accordingly, a greater lifting force is exerted on the more heavily loaded side of the worktable 16 than on the lightly loaded side of the same, lifting the table for rotation without binding on the raised portion 12 of the base 10.

For the purpose of distributing pressure fluid to different portions of the undersurface of the worktable, the flat upper surface 14 of the circular raised portion 12 of the base is provided with a plurality of spaced depressions or recesses 34 defining air-lift pads, each recess suitably being circular in shape, as shown in Fig. 1 of the drawings. Two concentric circular arrays of such pads 34 are provided. The depth of the pad or depression is appreciable so that the fluid pressure within the pad equalizes over the pad face. The remainder of the upper surface 14 of the base portion 12 is smooth and flat and is without channels or grooves. The lower surface 15 of the worktable 16 is likewise a smooth, flat plane having a high finish.

Pressure fluid is applied to each of the pads 34 through a plurality of vertical passageways 35, one from each of the pads, extending through the base portion 12 and communicating with a large annular manifold housing 36 sealingly fastened to the lower surface of the base 10. The manifold chamber is connected by a pipe 37 to a source of pressure fluid such as, for example, air under pressure.

While the fluid used for the lifting device is preferably air, it is obvious that hydraulic oils may be employed. Air, however, being a gas, presents no problem of collecting and reclaiming since it may be simply and safely vented to the atmosphere. Not only is a piping system for removing the fluid avoided, but the simple annular manifold 36 supplies the high pressure air to the various pads 34 from the usually convenient shop air line.

The supply of air to the manifold is desirably controlled by a three-way control valve 39. This valve is desirably of the type which can be manually operated to supply air under pressure to the manifold for lifting the worktable and also to vent the back pressure from the manifold when the worktable is to be lowered. When the valve is open and air under sufficient pressure is supplied to the manifold and thence to the pads, a lifting force is exerted on the rotary worktable 16 on its lower surface 15 above each of the pads 34 in the inner and outer circular arrays on the base portion 12. This results in a very small elevation of the worktable which is, at most, a few thousandths of an inch, but which is sufficient to, in effect, float the worktable 16 and allow it to be readily turned about the center spindle 18.

Provision is made for supplying pressure fluid to each recess pad 34 according to the force load it must sustain. This is accomplished by a constrictor 38 (Fig. 4) inserted in each of the passages 35 between the pads 34 and the manifold 36, which constrictor 38 acts to restrict the flow of air from the manifold into the pad.

The effect of the constrictors 38 will be clear upon reference to Fig. 3, similar reference characters being used where applicable and distinguished by prime marks, which schematically shows a worktable 16' having an off-center load W'. When air pressure is applied, via the pads 34', 34'', to the under surface 15' of the worktable 16', a lifting force is exerted which tends to lift the worktable 16' and the workpiece W'. Because of the asymmetric or off-center loading of the workpiece on the worktable, a greater downward load is present on one side of the worktable (shown at the left in Fig. 3) which, as a result, tilts slightly downwardly on that side. This slight downward tilt of the worktable reduces the clearance between the worktable under surface 15' and the upper surface 14' of the base on the one side of the rotary table carrying the heavier load, and thereby restricts the flow of air outwardly between these surfaces 14', 15' from the corresponding pads 34'' which must sustain the greater portion of the weight of the worktable and workpiece. At the same time, this tilt increases the separation between the surfaces 14', 15' of the worktable and the base on the opposite side (the right side in Fig. 3) of the rotary table to reduce the restriction of the air flowing from the pads 34' on that side of the base 10'. Correspondingly, the fluid pressure in the pads 34'' on the side of the table carrying the greater portion of the load is increased while the fluid pressure in the pads 34' on the opposite side of the table is decreased. As a result, a greater force is exerted on one side of the worktable to lift it away from the base even though the load carried thereon is greater than on the other side of the worktable. Such a tilting and separation for an off-center load is shown in exaggerated form in Fig. 3.

This fluid pressure difference is afforded by the constrictors 38 which restrict the flow of air out of the manifold 36. The manifold pressure thus remains substantially constant and a pressure drop in those pads which must supply the greater lifting force is thereby avoided.

By the use of spaced pressure pads connected through a constrictor to a common manifold, an asymmetrically loaded worktable can be lifted or floated for rotation on a base. Such a construction affords a variation in lifting force according to the disposition of the weight on the worktable that the workpiece carries. The forces tending to tilt the worktable on the base are thus opposed by equal lifting forces in the pads and binding of the table on the base is prevented. In this manner the pressure fluid table lifting device compensates for the very slight tilting of an asymmetrically loaded worktable which tends to cause a more free escape of air from the pads under its unloaded side. Thus the entire worktable floats on an air cushion a few thousandths of an inch thick, the lift of the table being limited by the leakage of the air under the table rim and the available pressure in the manifold.

For establishing a desired pressure drop across the passageway 35 (Figs. 2 and 4), the cross-section area and length of the constrictors 38 are readily controlled as indicated in Fig. 4. This view illustrates a practical arrangement not detailed in Fig. 2 for the sake of clarity of that drawing figure. As shown in Fig. 4, each passageway 35 is formed by a relatively large vertical bore through the base 12. This bore, which may be of the order of one-fourth inch diameter, for example, is effectively reduced in cross-section by a separately fabricated press-fitted tubular insert or bushing 38 the bore 40 of which comprises the constricted portion. A rod or wire 41 is positioned as a central member within the bore 40 of the bushing 38 and is supported as by bending over its lower end 42 and thus supporting it on the inner surface 44 of the manifold 36 below the bore 35. The annular space thus defined between the inner surface of the bushing bore 40 and the outer surface of the rod 41 defines the cross-section area of the constrictor. The rod length is conveniently greater than the bushing length, the length of the bushing thus determining the constrictor. While one skilled in the art will appreciate that the constrictor dimensions are governed by the particular requirements of apparatus embodying my invention, an order of magnitude is indicated by the dimensions in the illustrative embodiment wherein the bushing 38 is .375 inch long with an inner bore (40) diameter of .086 inch and the rod (41) diameter is .072 inch. It will be appreciated that the cross-section area of the constrictor can be conveniently changed without remachining the table by the expedient of varying the size of the rod 41. The dimensional requirements are thus met with a minimum of machining difficulty and clogging is avoided by reason of the annular construction.

It may be helpful to present at this point an illustrative example employing actual dimensions in order to indicate the relative magnitude of the dimensions involved in an operation of the illustrative embodiment. A worktable 48" in diameter constructed along the lines described above is supported on a base of the type described. The base is formed with a total of 22 pads located, as shown in Fig. 1, in circles 41¾ inch and 33¼ inch in diameter. The pads for such a table are 3" in diameter and 0.015" deep. An illustrative loading of the table is as follows:

Load on table=7,350 lbs.
Location of center of gravity of load=9" from center of table.
Air presure in manifold=60 p.s.i.
Approximate area of each constrictor=0.0458".

With a loading under these conditions the separation of the worktable from the base was measured and it was found that the separation on the loaded side (the left side as shown in Fig. 3) equalled 0.0006" while the separation on the side opposite the load equaled 0.0075".

It is thus clear that, with a table constructed in accordance with the present invention, even though a substantial off-center load is placed on such a table, an air cushion is at all times provided between the work table and the base. This air cushion effectively prevents the work table from binding on the base and facilitates the rotation of the worktable.

In order to limit the upward movement of the worktable 16 when it is under a relatively light load, such as a small workpiece or a workpiece made of a light metal such as aluminum, and at the same time prevent the table from binding on the stub shaft as it rotates, a thrust bearing 46 is placed on the stub shaft adjacent the large diameter upper end portion 22 thereof (Fig. 2). As the worktable 16 rises under the force of the fluid pressure in the pads 34 a shoulder 47 between the center bores 20 and 23 engages the thrust bearing 46 which thus defines the upper limit of movement of the table. The thrust bearing 46 being of the anti-friction type, does not hinder rotation of the table about the stub shaft 18. In addition, the thrust bearing affords a maximum upper limit without binding even though the table may be slightly tilted by an off-center load.

In order to accurately index the rotary worktable 5 in a selected position, the positive indexing means 28 is incorporated on the base 10 of the rotary table and cooperates with a suitable socket 29 incorporated in the lower rim 25 of the worktable 5 so that the table may be precisely positioned as desired. An indexing means useful in accordance herewith can desirably be of the type described and claimed in application Serial No. 488,593, filed February 16, 1955, now Patent No. 2,787,175, to which reference is hereby made for further detailed description.

Means are desirably provided for clamping the table firmly to the base. One means shown for purposes of illustration comprises a clamping bar 50 located below each corner of the table 16 and adapted to be screwed down against the lower flange 30 of the table extending from its rim 25. The bars 50 are suitably mounted on upstanding studs 51 extending from the base 10.

Provision is made for clamping the clamping bars 50 against the flange 30. This can be accomplished by tightening nuts 52 shown, for example, in Fig. 2.

In operation, the indexing sockets 29 are set in selected locations on the rotary table 16. When it is desired to turn the table to a preselected indexed position clamps 50 are released and the air lift mechanism is actuated by valve 39 to lift the table and the workpiece carried thereon. The table is then turned to approximately the desired position and the indexing means 26 is engaged with the socket 29 to accurately index the table. When the table is so indexed, the table lift pressure is removed by actuating the 3-way valve 39 to close the air supply line and vent the manifold to permit the air entrapped in the pads to escape. If desired, the air may instead be allowed to escape more slowly from under the lower rim 25 of the table. In any event, the table after being lowered by the drop of air pressure in the manifold and pads, rests solidly on the upper surface of the raised base portion 12 in metal to metal contact except at the pad areas.

The table is then clamped to the base by actuating the clamp bars 50 either manually or automatically. In this manner the index means does not sustain any of the load imposed by the forces involved in the subsequent machining operation.

A rotary machine tool table has thus been described which includes an improved fluid pressure lifting device for lifting the worktable when it carries an off-center or asymmetrically disposed workpiece and which facilitates the rotation of the worktable by preventing it from binding on its base. When so raised, the table is easily rotated to move the workpiece carried thereon into position on the machine tool for the performance of desired cutting operations. When the table has been positioned, the worktable can then be lowered on to the base where it is securely held during the ensuing cutting operation.

I claim as my invention:

1. A tilt-resisting machine tool table comprising a base having a raised portion defining a smooth, flat, upper surface, a worktable mounted for rotation on said base and having a lower smooth, flat surface, said base surface having a circular array of individual pad-like depressions around the worktable axis of rotation, each of said depressions communicating with the lower side of the base through an individual passage incorporated in the base, an annular manifold housing detachably secured to said lower side of the base, an upstanding rod supported in said manifold below each passage and extending therein to define an annular opening, means for supplying air under pressure to said manifold and thereby to the pad-like depressions in the base to apply a lifting pressure to the worktable, and means defining a constricted cross-section area in each of said passages whereby a substantial pressure drop is developed during air flow therethrough.

2. A tilt-resisting rotary table of the type useful for asymmetrically supporting heavy workpieces in a machine tool and comprising a base mountable in the machine tool, a worktable mounted for rotation on said base for presenting the workpiece to the machine tool in a selected attitude, said base and said worktable having facing complementary surfaces for supporting said worktable on said base, said base surface having an array of separate recessed areas each communicating with the other side of the base through an individual passage incorporated in the base, a manifold housing sealingly secured to said other side of the base and extending over the opening of each passage, means for supplying fluid under pressure to said manifold to apply a lifting pressure to the table from the recessed areas in said base, an annular bushing in each of said passages, and a central member positioned in the bore of each of said bushings for defining an annular constrictor for restricting the flow of pressure fluid between said recesses and the manifold, said worktable being rotatable on said base when the pressure fluid in said recesses applies a lifting force to said worktable, said constrictors preventing the rapid escape of pressure fluid from said manifold when an asymmetric workpiece load on said worktable causes said worktable to tilt whereby the lifting force exerted on the worktable by the pressure fluid is sustained over said worktable surface to preclude binding between the asymmetrically loaded worktable and the base as the worktable is rotated.

3. A tilt-resisting rotary table of the type useful for asymmetrically supporting heavy workpieces in a machine tool and comprising a base mountable in the machine tool and having a raised upper surface, a worktable mounted for rotation on said base for presenting the workpiece to the machine tool in a selected attitude, said worktable having a lower surface complementary with said upper surface on the base for supporting said worktable on said base, said base having a circular array of individual passages incorporated therein and opening into separate apertures in the surface of the base, each of said passages communicating with the lower side of the base, an annular manifold housing sealingly secured to the lower side of the base and extending over the opening of each pasage, means including a control valve for supplying pressure fluid to said manifold, and an annular bushing in each of said passages, and a central member positioned in the bore of each of said bushings for defining an annular constrictor for restricting the flow of pressure fluid through said passages, said worktable being rotatable on said base when a pressure fluid lifting force is applied to said worktable, said constrictors preventing the rapid escape of pressure fluid from said manifold when an asymmetrically located workpiece load on said worktable causes said worktable to tilt with respect to the base, whereby the fluid pressure in said manifold is sustained and the lifting force exerted on the worktable by the pressure fluid is sustained to prevent binding between the asymmetrically loaded worktable and the base as the worktable is rotated.

4. A tilt-resisting rotary table of the type useful for asymmetrially supporting heavy workpieces in a machine tool and comprising a base mountable in the machine tool and having a raised upper surface, a worktable mounted for rotation on said base for presenting the workpiece to the machine tool in a selected attitude, said worktable having a lower surface complementary with said upper surface on the base for supporting said worktable on said base, said base surface having a circular array of individual pad-like depressions around the table rotational axis, each of said depressions communicating with the lower side of the base through an individual passage incorporated in the base, an annular manifold housing sealingly secured to the lower side of the base and extending over the opening of each passage, means including a control valve for supplying pressure fluid to said manifold, an annular bushing in each of said passages, and a central member positioned in the bore of each of said bushings for defining a constrictor of annular cross-section for restricting the flow of pressure fluid between said manifold and said pad-like depressions, said worktable being rotatable on said base when pressure fluid from said pad-like depressions applies a lifting force to the lower surface of said worktable, said constrictors preventing the rapid escape of pressure fluid from said manifold when an asymmetrically located workpiece load on said worktable causes said worktable to tilt with respect to the base, whereby the fluid pressure in said manifold is sustained and the lifting force exerted on the worktable by the pressure fluid is sustained to preclude binding between the asymmetrically loaded worktable and the base as the worktable is rotated.

5. A tilt-resisting rotary table of the type useful for asymmetrically supporting heavy workpieces in a machine tool and comprising a base mountable in the machine tool and having a raised upper surface, a stub shaft secured to said base and projecting upwardly from said base surface, a worktable mounted for rotation about said stub shaft for presenting the workpiece to the machine tool in a selected attitude, said worktable having a lower surface complementary with said upper surface on the base for supporting said worktable on said base, a thrust bearing on the end of said shaft and engageable by said worktable for limiting axial sliding movement of said worktable on said shaft, said base surface having a circular array of individual pad-like depressions spaced around the stub shaft, each of said depressions communicating with the lower side of the base, through an individual passage incorporated in the base, an annular manifold housing sealingly secured to the lower side of the base and extending over the opening of each passage, means including a control valve for supplying pressure fluid to said manifold, an annular bushing in each of said passages, and a central member positioned in the bore of each of said bushings for defining a constrictor of annular cross-section for restricting the flow of pressure fluid between said manifold and said pad-like depressions, said worktable being rotatable on said stub shaft relative to said base when pressure fluid from said pad-like depressions applies a lifting force to the lower surface of said worktable, said constrictors preventing the rapid escape of pressure fluid from said manifold when an asymmetrically located workpiece load on said worktable causes said worktable to tilt with respect to the base, whereby the fluid pressure in said manifold is sustained and the lifting force exerted on the worktable by the pressure fluid is sustained to preclude binding between the asymmetrically loaded worktable and the base and stub shaft thereon as the worktable is rotated.

6. A tilt-resisting machine tool table comprising a base having a circular raised portion defining a smooth, plane upper surface, a circular worktable mounted for rotation on said base and having a downwardly extending apron surrounding said raised base portion and a smooth, plane undersurface opposed to said base surface, said base surface having therein a circular array of spaced apart individual pad-like depressions concentric with the worktable rotation axis, each of said depressions communicating with the lower side of the base through an individual passage incorporated in the base, an annular manifold housing hermetically secured to said lower side of the base, means for supplying air under pressure to said manifold and thereby to said passage and said depressions to apply a lifting pressure to the underface of the worktable, and means defining a constrictor in each of said passages whereby a substantial pressure drop is developed during air flow therethrough.

7. A tilt-resisting fluid lift machine tool table assembly comprising a rigid base having a circular raised portion defining a smooth plane horizontal upper surface, a circular worktable mounted for rotation on said base and having a downwardly extending apron surrounding said raised base portion and a smooth plane lower surface opposed to said base surface, said base having an array of separate recesses on its upper surface each communicating with the lower side of the base through an individual orifice incorporated in the base, a manifold housing sealingly secured to said other side of the base, and means for supplying fluid under pressure to said manifold and thereby to said recesses through said orifices to apply a lifting pressure to the table, each of said orifices having a central member positioned therein defining a restricted annular orifice opening whereby a substantial pressure drop is developed during fluid flow therethrough.

References Cited in the file of this patent

UNITED STATES PATENTS

| | | |
|---|---|---|
| 2,536,937 | Hosea | Jan. 2, 1951 |
| 2,710,234 | Hansen | June 7, 1955 |

FOREIGN PATENTS

| | | |
|---|---|---|
| 4,685 | Great Britain | 1911 |